United States Patent
Reddy et al.

(10) Patent No.: US 10,798,067 B2
(45) Date of Patent: Oct. 6, 2020

(54) RECORDING ENCRYPTED MEDIA SESSION

(71) Applicant: Cisco Technology, Inc., San Jose, CA (US)

(72) Inventors: Tirumaleswar Reddy, Bangalore (IN); Daniel G. Wing, San Jose, CA (US); Prashanth Patil, Bangalore (IN); Ram Mohan R., Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 546 days.

(21) Appl. No.: 14/643,802

(22) Filed: Mar. 10, 2015

(65) Prior Publication Data
US 2016/0269365 A1  Sep. 15, 2016

(51) Int. Cl.
*H04L 9/32* (2006.01)
*H04L 29/06* (2006.01)
*H04L 9/08* (2006.01)

(52) U.S. Cl.
CPC ........ *H04L 63/0428* (2013.01); *H04L 9/0822* (2013.01); *H04L 2209/60* (2013.01)

(58) Field of Classification Search
CPC .... H04L 63/0428; H04L 9/14; H04L 2209/24
USPC .......................................................... 713/168
See application file for complete search history.

(56) References Cited

U.S. PATENT DOCUMENTS

| | | | |
|---|---|---|---|
| 5,991,300 A | 11/1999 | Tappan | |
| 6,104,695 A | 8/2000 | Wesley et al. | |
| 6,463,155 B1 * | 10/2002 | Akiyama | H04H 20/28 348/E7.063 |
| 7,203,844 B1 * | 4/2007 | Oxford | G06F 21/10 380/269 |
| 7,231,516 B1 * | 6/2007 | Sparrell | H04N 5/783 348/E7.056 |
| 7,634,554 B2 | 12/2009 | Cook | |
| 7,738,383 B2 | 6/2010 | Wing et al. | |
| 8,374,095 B2 | 2/2013 | Boutros et al. | |
| 2003/0208681 A1 * | 11/2003 | Muntz | G06F 21/6209 713/179 |
| 2004/0030891 A1 * | 2/2004 | Kurihara | H04L 9/0822 713/168 |
| 2004/0083487 A1 * | 4/2004 | Collens | H04N 21/26606 725/31 |
| 2007/0297418 A1 * | 12/2007 | Lee | H04L 63/00 370/395.52 |
| 2009/0116646 A1 * | 5/2009 | Pippuri | G06F 21/10 380/259 |

(Continued)

OTHER PUBLICATIONS

David Butcher TrustStream: Security Challenge and Defense in VoIP Infrastructures; IEEE; Year: 2007; 1152-1162.*

(Continued)

*Primary Examiner* — Monjur Rahim

(57) ABSTRACT

In one implementation, a media stream is recorded using one or more keys. The one or more keys are also encrypted. The one or more encrypted keys may be stored with the encrypted media session at a cloud storage service. A network device receives a request to record a media stream and accesses at least one stream key for the media stream. The stream key is for encrypting the media stream. The network device encrypts the stream key with a master key. The encrypted stream key is stored in association with the encrypted media stream.

20 Claims, 6 Drawing Sheets

(56) References Cited

U.S. PATENT DOCUMENTS

| | | | |
|---|---|---|---|
| 2009/0296926 A1* | 12/2009 | Perlman | H04L 9/083 380/44 |
| 2009/0316697 A1 | 12/2009 | Dakshinamoorthy et al. | |
| 2012/0110335 A1* | 5/2012 | Sandler | H04N 7/1675 713/176 |
| 2012/0198241 A1* | 8/2012 | O'Hare | G06F 21/602 713/189 |
| 2013/0064364 A1* | 3/2013 | Orsini | H04L 9/085 380/37 |
| 2014/0006639 A1 | 1/2014 | Wing et al. | |
| 2014/0280720 A1* | 9/2014 | Bischoff | G06F 9/5072 709/217 |

OTHER PUBLICATIONS

Bonica, et al., Extended ICMP to Support Multi-Part Messages, https://tools.ietf.org/html/rfc4884, Apr. 2007.

Martinsen, et al., Differentiated Priorities and Status Code-Points Using Stun Signalling (DISCUSS), http://tools.ietf.org/html/draft-martinsen-tram-discuss-00, Feb. 12, 2014.

Rosenberg, et al., Session Traversal Utilities for NAT (STUN), http://tools.ietf.org/html/rfc5389, Oct. 2008.

U.S. Appl. No. 14/225,644, filed Mar. 26, 2014.

* cited by examiner

RECORDING ENCRYPTED MEDIA SESSION

TECHNICAL FIELD

This disclosure relates in general to the field of recording of media streams, and more particularly, to a tiered encryption technique for recorded media streams.

BACKGROUND

Cloud computing may broadly describe any computing resource that is utilized by a user or an endpoint at a different physical location. A more limited definition may include centralized data storage. Economies of scale may be realized. For example, the centralized data storage may be provided less expensively by remote servers than individual users.

However, some security concerns have been raised regarding centralized data storage. The first concern is that the owner of the cloud storage devices (e.g., servers) and the owner of the data may have interests that are not aligned. The cloud storage service may be focused more on attracting new customers and revenue streams rather than the security of existing data. The cloud storage service may prefer to sell data rather than keep it private in certain scenarios, for example, when the cloud service bill is not paid. The security of the cloud storage service may be breached, and the data may be released to unauthorized users. Challenges remain in fully protecting the data stored at cloud storage devices.

BRIEF DESCRIPTION OF THE DRAWINGS

Exemplary embodiments of the present embodiments are described herein with reference to the following drawings.

DESCRIPTION OF EXAMPLE EMBODIMENTS

Overview

Figure 1:
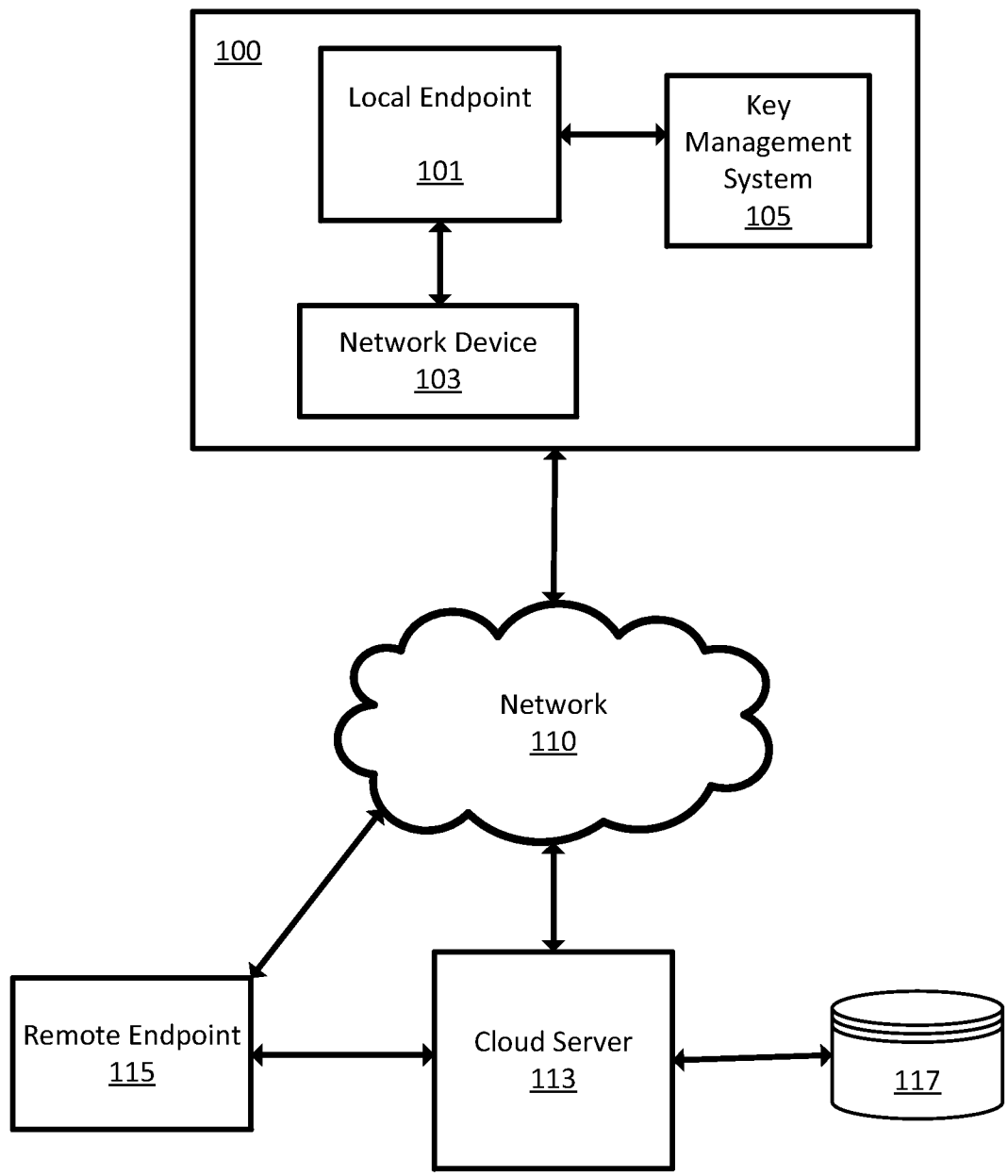
FIG. 1 illustrates an example system for encryption of a cloud based recorded media session.

In an embodiment, a network device executes instructions for receiving a request to record a media stream, and receiving at least one stream key in response to the media stream. The media stream is encrypted with the at least one stream key. In addition, the method includes accessing a master key, encrypting, with the processor, the at least one stream key with the master key, and storing the encrypted at least one stream key in association with the encrypted media stream.

In an embodiment, a network device executes instructions for receiving a request to access a media stream, accessing an encrypted stream key, decrypting the encrypted stream key with a master key, and decrypting an encrypted media stream with the decrypted stream key.

Example Embodiments

Media stream recording plays a critical role in many business communication environments, such as call centers and financial trading floors. The media streams may be telephone calls (e.g., voice over internet protocol, or VoIP calls), video calls, or other media streams. In some environments, all media streams must be recorded for regulatory and compliance reasons. In others, media streams may be recorded for quality control or business analytics. The media stream recordings may be stored on a cloud device.

Cloud based storage in many cases is cheaper than on premise storage. However, cloud based storage may introduce a variety of privacy problems or the perception of the potential for privacy problems. The administrator of cloud based storage often has access to the data stored. The owner of the data, or the client of the cloud storage service, may prefer that the administrator not have this access. In addition, if an attacker or another unauthorized user were to gain access to the cloud storage then the unauthorized user would be able to access the contents.

This problem may be solved by encrypting the content before storing the content on the cloud storage. However, additional problems may arise when the content is encrypted and subsequently stored on the cloud storage. The encryption or decryption keys may be misplaced by the user, who must store the keys somewhere and remember the location in the future. Because the decryption keys are not available to the public cloud to prevent any misuse, the decryption keys are not stored in association with the encrypted content. Thus, human beings on another network may be responsible for keeping track of the decryption keys. The result may be lost decryption keys. As a result, the encrypted cloud content is unusable. Much time may have passed, and the corresponding fees for the cloud storage are wasted because the encrypted cloud content cannot be accessed.

The following embodiments provide example systems in which media stream recordings are encrypted and stored in a cloud device in association with a decryption key that is also stored securely after being encrypted by another key. In one example, a symmetric key algorithm may be performed in which a single key is used for both encryption and decryption, and in this example, the single key is encrypted by another key. As used herein, the terms decryption key and encryption key may refer to a single key or different keys.

FIG. 1 illustrates an example system for encryption of a cloud based recorded media session. A local network 100 includes a local endpoint device 101, a key management system 105, and a network device 103, which is in communication and coupled with an external network 110 (e.g., Internet). The external network 110 provides communication with a remote endpoint device 115 directly or through a cloud server 113, which may internally or externally be coupled with cloud storage 117. More endpoint devices may be included, and any of the endpoint devices may be personal computers, mobile devices, set top boxes, tablet computers, and/or any computing device configured for network communication. The network device 103 may be a server, a router, a gateway, or another network device. The network device 103 may include a firewall such as a port control protocol (PCP) aware firewall. Additional, different, or fewer components may be included in the system of FIG. 1.

The local endpoint device 101 may receive a request to record a media stream. The request may be from a user of the local endpoint device 101. For example, the local endpoint device 101 may run a video conferencing program or collaboration program that includes a record option that the user selects using an input device (e.g., touchscreen or keyboard). The request may be from a policy setting. For example, all media stream involving the local endpoint device 101 may be recorded, or specific types of streams, specific participants, or particular endpoints within a business or enterprise. The network device 103 may receive the request to record the media stream from the local endpoint device 101. In one alternative, the local endpoint device 101 or the network device 103 may receive the request to record the media stream from an intermediary server (not shown). The intermediary server may be a session border controller, a back to back user agent (B2BUA), a firewall, or another server.

The local endpoint device 101 may access at least one stream key in response to the media stream. The stream key is assigned to the media stream, and different stream keys may be generated for different media streams. The stream key may be, but is not limited to being, a data encryption standard (DES) key, a cipher block chaining (CBC) key or an authenticated encryption with additional data (AEAD) key.

The key management system 105 may include a processor, memory, and database. The database may store multiple keys and associate keys with authorized users. The key management system 105 may generate new keys upon request.

The network device 103 may encrypt the stream key with a master key. The master key may be a symmetric encryption algorithm that uses the same key for both encryption and decryption. One example of a symmetric encryption algorithm is the advanced encryption standard (AES). The network device 103 may retrieve the master key from the key management system 105. The network device 103 may request the master key using public key technology. The network device 103 may be authenticated as authorized to receive the master key by the key management system 105.

The master key may be a long term key used by the local network 100 for a relatively long time period (e.g., months or years) or a short term key used for a relatively shorter time period (e.g., days or weeks). The network device 103 may initiate the storage of the encrypted stream key in association with the encrypted media stream at the cloud server 113.

The network device 103 may forward the media stream to the cloud server 113. In some examples, all recorded media streams are routed through the cloud server 113. The cloud server 113 may be a traversal using relays around network address translation (TURN) server. The cloud server 113 may record all media stream received or relayed through the cloud server 113.

The media stream may be initiated using Web Real Time Communication (WebRTC), which may be executed by the local endpoint device 101 and the remote endpoint device 115. The WebRTC framework provides the protocol building blocks to support direct, interactive, real time communication using audio, video, collaboration, games, and other applications between peer web browsers. WebRTC endpoints can exchange both media and generic data. The media may be delivered using real time transport protocol (RTP) and/or Secure RTP (SRTP). The data channel may be established for non-media data types, for example, to download files. In the WebRTC context, stream control transmission protocol (SCTP) over datagram transport layer security (DTLS) over user datagram protocol (UDP) may be used for file transfers and DTLS-SRTP is used for the media streams.

WebRTC is an example of a browser based and peer to peer communication technique. WebRTC is an alternative to third-party plugins for a browser or other proprietary software. WebRTC may be implemented using a simple script or application programming interfaces (APIs), which may be implemented using an object oriented programming language (e.g., Java). Example APIs include, but are not limited to including, MediaStream for the acquisition of video and/or audio streams, RTCPeerConnection for communication of video and/or audio data, and RTCDataChannel for communication of arbitrary application data. The local network 100 may include a policy (e.g., info-sec policy) that instructs calls using third party applications like WebRTC should be recorded. To be able to leverage cloud storage to record WebRTC calls, the local network 100 encrypts the stream keys to avoid leaks, as described in the embodiments herein.

Figure 2A:
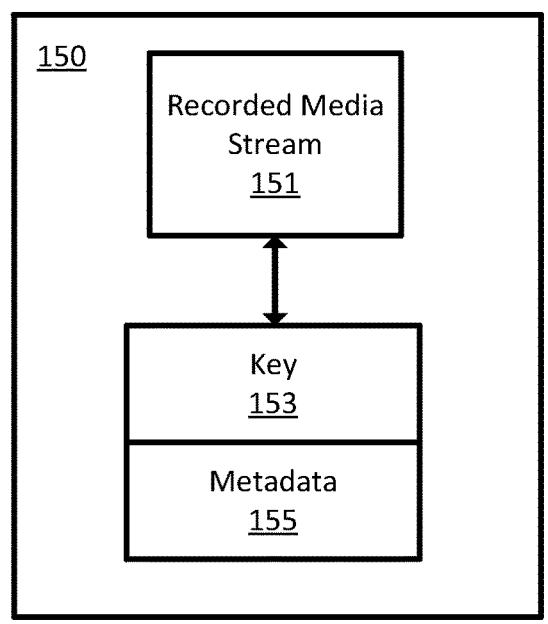
FIG. 2A illustrates an example recorded media session.

FIG. 2A illustrates an example recorded media session package 150 (e.g., data file or set of data files). The recorded media session package 150 may include the recorded media stream 151, an encrypted stream key 153 associated with the media stream 151, and supplemental metadata 155. In one example, the supplemental metadata 155 and the encrypted stream key 153 may be termed metadata, collectively.

The supplemental metadata 155 may include other information pertinent to the media stream. The supplemental metadata 155 may include participant data such as a number of participants, identifiers for the endpoints (e.g., IP addresses) participating in the media stream and/or identifiers for the users (e.g., usernames) participating in the media stream. The supplemental metadata 155 may include statistical data for the media stream. The statistical data may include, but is not limited to including, the duration of the call, the data size of the media stream in total or per unit time, the date and time of the media stream, the resolution of the media stream for video, or other features. The supplemental metadata 155 may also include technical data for the media stream. The technical data may include the codecs for the media stream, the bandwidth for the media stream, or other features.

The supplemental metadata 155 may be encrypted using the master key that is only available with the entity that has authorization to download, decrypt and analyze the recorded call or media stream. In other examples, the supplemental metadata 155 may not be encrypted. The supplemental metadata 155 may be stored in association with the recorded media session 151.

The supplemental metadata 155 may be encoded using session initiation protocol recording (SIPREC) metadata. SIPREC metadata may be described in "draft-ietf-siprec-metadata" published in August 2014, and available from the website ietf.org. SIPREC provides that the metadata is in the format of extensible markup language (XML). The SIPREC metadata may describe attributes of a video conference.

SIPREC provides that the metadata may include a communication session class, a media stream class, and/or a participant class. The communication session class may have one or more of the following attributes: a termination reason that represents the reason why a media stream was terminated, an identifier that identifies the media stream, a start time of the media stream, or a stop time of the media stream. The media stream class may have one or more of the following attributes: a content of the media stream, and/or a media stream type value. The participant stream class may include one or more of the following attributes: a joint time that describes when a participant joined the media stream, a disassociate time that describes when a participant leaves the media stream, a receiving attribute that indicates whether or not a participant is receiving the media stream, and a sending attribute that indicates whether or not a participant is sending data to the media stream.

Figure 2B:
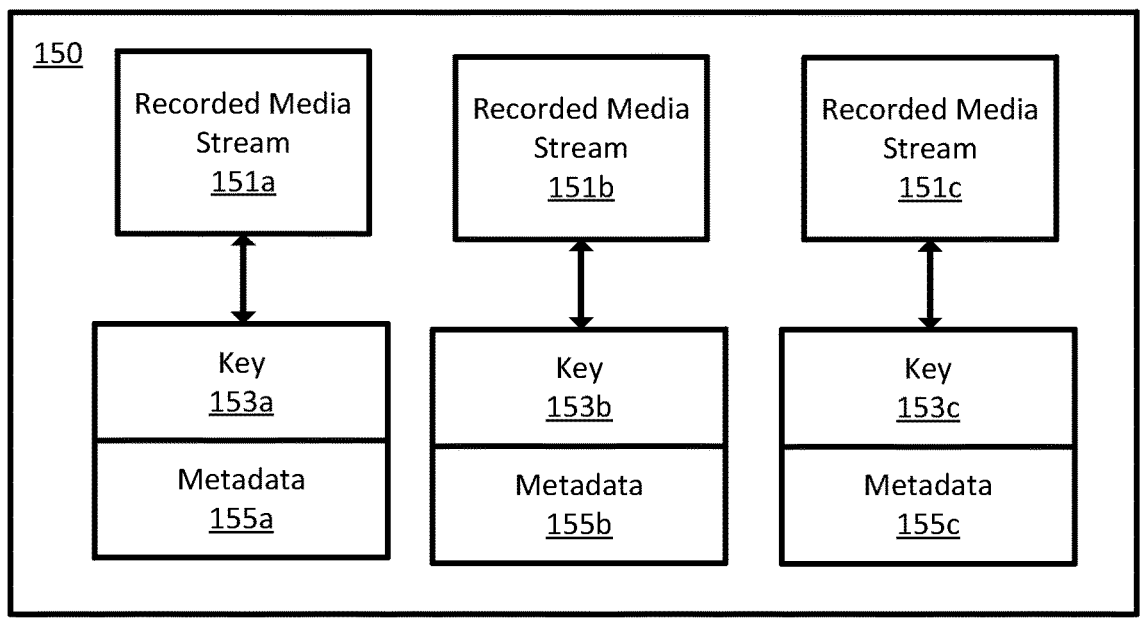
FIG. 2B illustrates an example of multiple recorded media sessions.

FIG. 2B illustrates an example of a media recording package 150 (e.g., media session) including multiple recorded media streams 151a-c associated with stream specific encryption keys 153a-c and other metadata 155a-c. The recorded media streams 151a-c may be components of a single media stream. For example, recorded media stream 151a may correspond to a first time interval (e.g., first 30 minutes) of the single media stream, recorded media stream 151b may correspond to a second time interval (e.g., second 30 minutes) of the single media stream, and recorded media stream 151c may correspond to a third time interval (e.g., third 30 minutes) of the single media stream. Other approaches may be used to define the media recording package. For example, multiple recordings of the same communication session from different endpoints, partial recording of a media session, or a persistent recording session that records all media regardless of when particular media sessions begin or end. Additional examples may be found in RFC 7245 published in 2014 on the IETF website or RFC published in 2011 on the IETF website.

In another example, the media recording package 150 may include multiple streams for a voice over internet protocol (VoIP) call or a video conferencing session. The media recording package 150 may include one or more streams for audio and one or more streams for video. For example, each user on the VoIP call or video conferencing session may generate a video stream and an audio stream for the media recording package 150.

Stream keys may be changed as the media stream progresses from the first time interval to the second time interval to the third time interval. Stream keys may be associated with a lifetime parameter that specifies a time duration or a quantity of packets that the stream keys. When the lifetime is expired or a threshold of maximum number of packets exchanged is reached, another stream key is generally used. The subsequent stream keys may be exchanged or specified using a rehandshake (second or subsequent handshake). The rehandshake may be performed in a datagram transport layer security (DTLS) session. The lifetime parameter for the recorded media stream 151a-c may be stored in metadata 155a-c, respectively. In one alternative, a sequence for the keys that are used over time may be stored in the metadata 155a-c.

Figure 3:
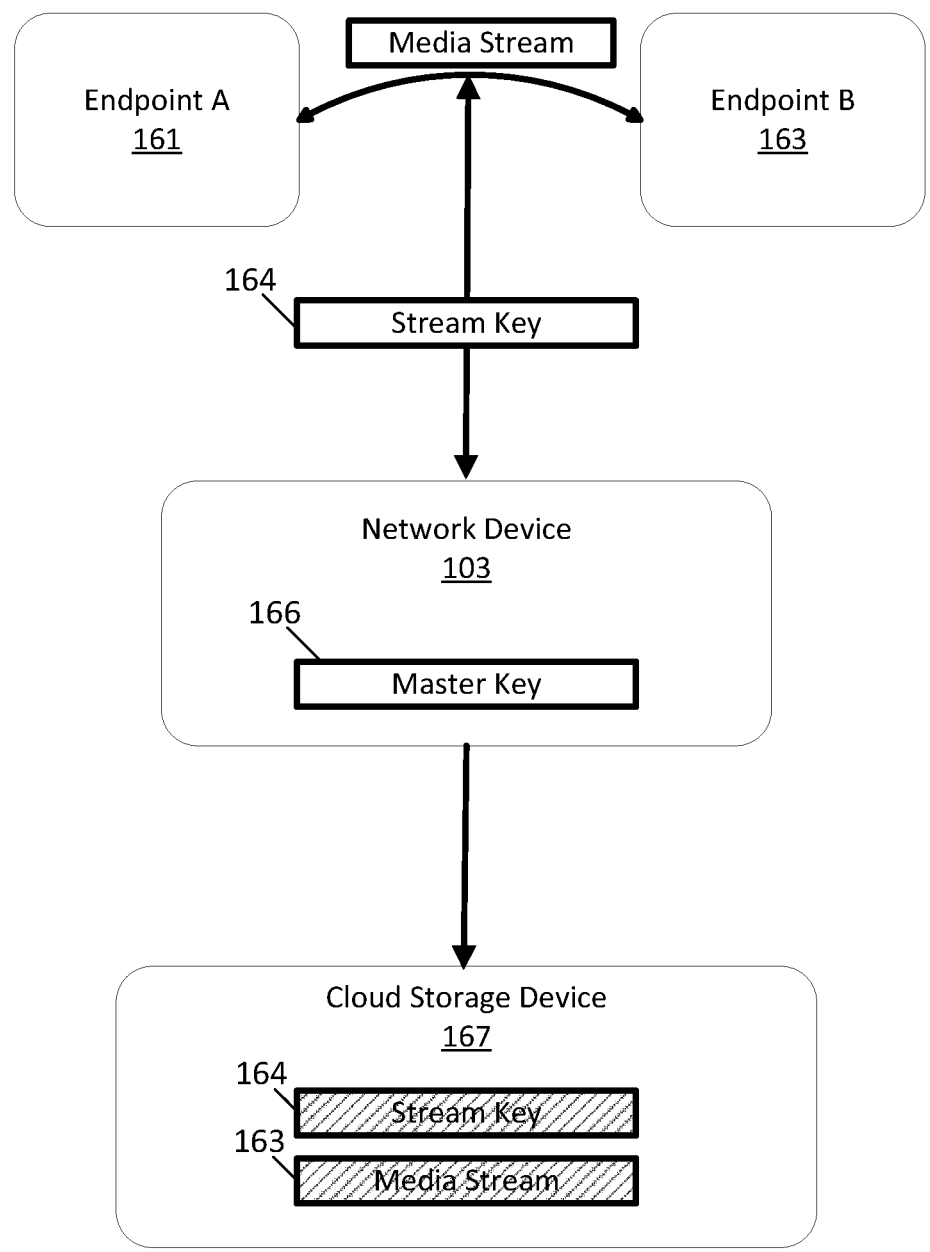
FIG. 3 illustrates an example of a multi-tiered encryption technique.

FIG. 3 illustrates an example of a multi-tiered encryption technique including stream keys 164, and a master key 166. An endpoint 161 and an endpoint 163 establish a media stream. The media stream may be initiated using session initiation protocol (SIP), and the endpoints 161 and 163 may have exchanged invite and acceptance messages. The media stream may be a video conference or another collaboration service.

The stream keys 164 may be used to secure the media stream. In one example, the stream keys 164 are derived from datagram transport layer security (DTLS) for secure RTP control protocol (SRTP). That is, the stream keys 164 may be DTLS client/server write keys.

Either of the endpoints 161 and 163, an edge device (not shown), or another network device (not shown) determines that the media stream should be recorded. The network device 103 accesses a recording policy. The recording policy may include a list of IP addresses. When one of the IP addresses is a participant in the media stream, the media stream is recorded. The recording policy may designate a department of a business where calls are always recorded (e.g., customer service), or designate a department of the business where calls are not recorded (e.g., human resources or legal department). The recording policy may list particular times of day or days of week that media streams are recorded. The recording policy may list device types that, when they are participants in the media stream, the media stream is recorded. For example, media streams associated with mobile devices or guest devices may be recorded. In any of these examples, the recording policy may specify what parts of the media stream are recorder. For example, the recording policy may specify that the audio is recorded, the video is recorded, or both the audio and video are recorded.

The cloud storage device 167 may store the encrypted recorded media stream 163 and the encrypted stream key 164 in a single file or in a single location. The cloud storage device 167 may index the encrypted recorded media stream 163 and the encrypted per stream key 164 with the same identifier.

At a subsequent time, a user device (not shown) may request the encrypted recorded media stream 163 from the cloud storage device 167. The user device may send a request to the cloud storage device 167 including an identifier for the encrypted media session. The cloud storage service 167 may determine whether the user is an authorized user. Authorized users may include the original participants in the media session. The authorized user may be authenticated using a credential or a password. The user is authorized by the network including the key management device 105 (FIG. 1). When the user is authenticated or authorized, the cloud storage device 167 returns the encrypted recorded media stream 163 and the encrypted stream key 164 to the user device. The user device fetches the master key from the key management server 105 using an identifier for the encrypted media session. The key management device 105 provides the master key for decrypting the stream key 164. The decrypted stream key 164 is used to decrypt the encrypted media stream 163.

Figure 4:
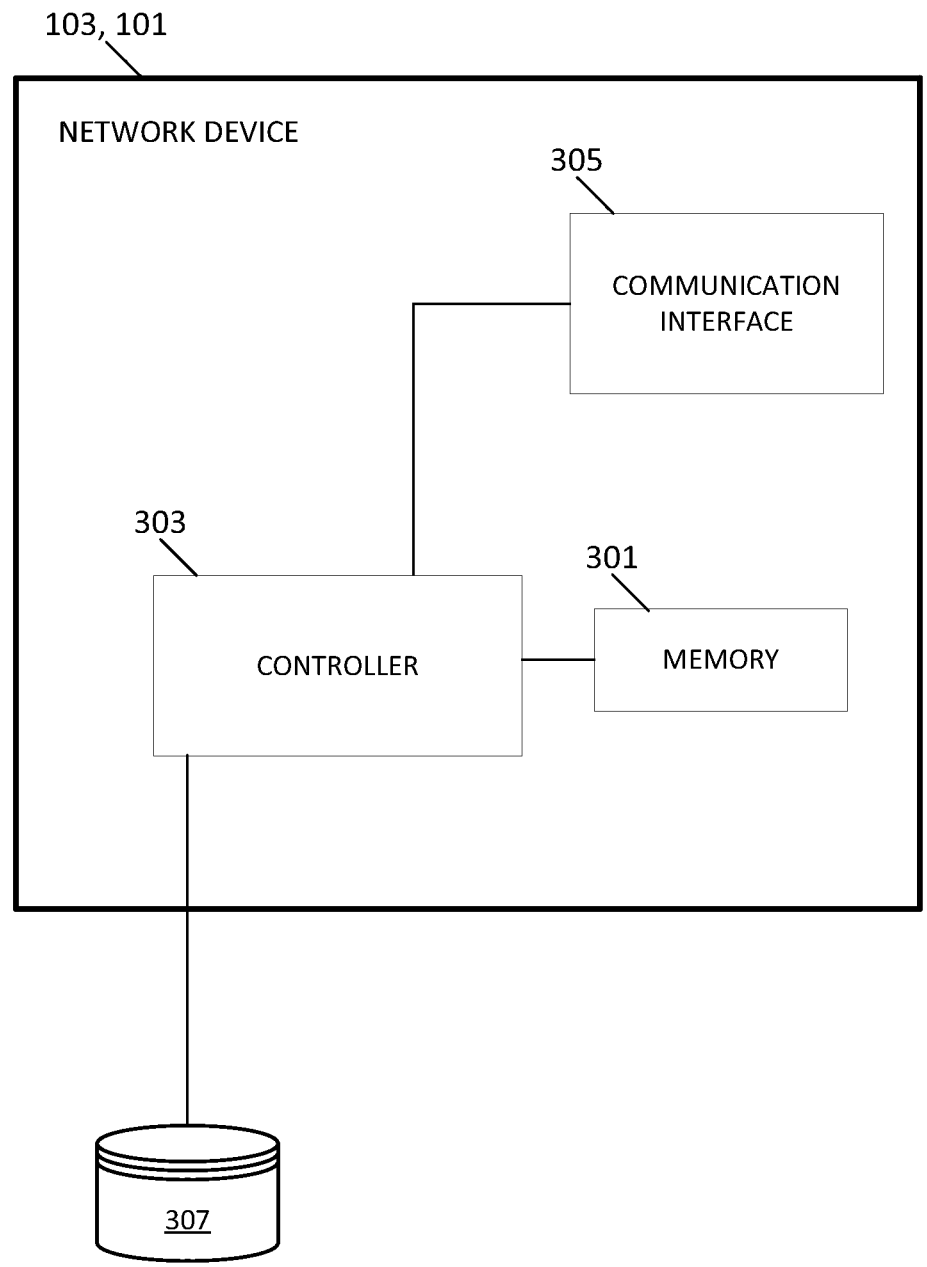
FIG. 4 illustrates an example network device for the system of FIG. 1.

FIG. 4 illustrates an example network device 103 or endpoint device 101 for the networks of FIG. 1 or FIG. 3, which may be referred to alternatively or collectively as a computing device. The computing device includes at least a memory 301, a controller 303, and a communication interface 305. In one example, a database 307 stores decryption and encryption keys. Additional, different, or fewer components may be provided. Different network devices may have the same or different arrangement of components.

Figure 5:
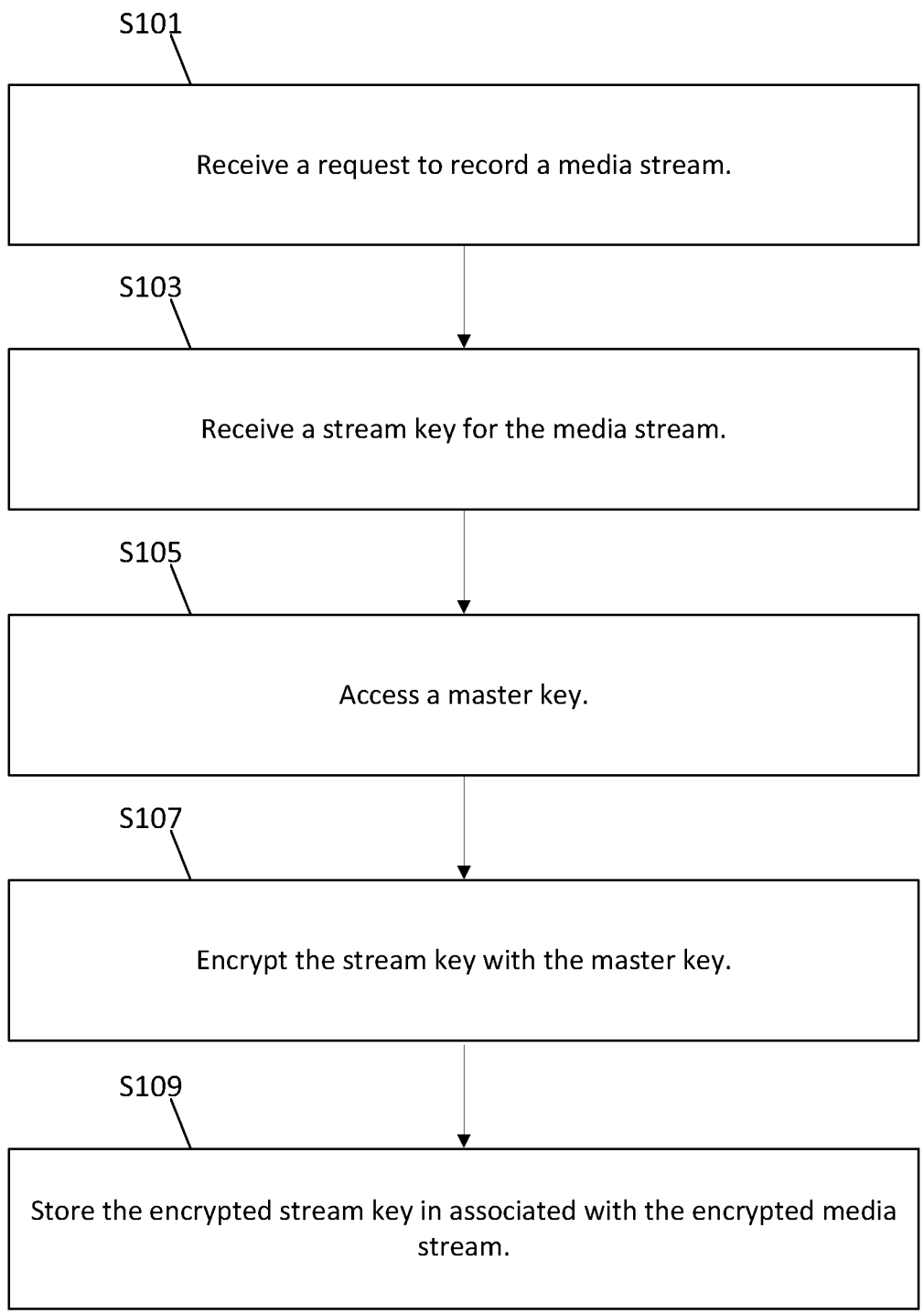
FIG. 5 illustrates an example flowchart for storing a cloud based recorded media session.

FIG. 5 illustrates an example flowchart for the computing device of FIG. 4. Additional, different, or fewer acts may be provided. The acts are performed in the order shown or other orders. The acts may also be repeated.

At act S101, the communication interface 305 or the controller 303 receives a request to record a media stream. The request may be a trigger from a rule that is caused based on a property of the media stream. The property may describe a participant in the media stream. For example, the rule may state that media streams involving a particular user or endpoint address are recorded. The property may describe a content of the media stream derived from the title of the media stream, the type of the media stream, or keywords identified from the media stream (e.g., voice recognition). In this example, the rule may state that media streams involving a particular content or type of content are recorded.

At act S103, the controller 303 receives at least one stream key in response to the media stream or after receiving the media stream. The media stream may be encrypted with the stream key by the computing device or another device. The controller 303 may receive or select the stream key through a handshake or negotiation in establishing the media stream. In one example, the keys are established independent of signal channel and on the media path. One side of the media path may be designated the client and one side designated the server.

The controller 303 may locate and interpret an identifier for the media stream. The identifier may be specified by the user. The identifier may uniquely identify the media stream. For example, the cloud storage service cannot store two media streams having the same identifier. The identifier may include data indicative of participants, a local network or enterprise, time stamps, department, and/or content of the media stream.

At act S105, the controller 303 accesses a master key. In one example, the master key is stored in memory 301. Alternatively, the controller 303 may access the master key from an external device (e.g., key management system 105). The controller 303 may send a request including the identifier to the external device. The external device may select the appropriate master key based on the identifier. Master keys may be assigned according to participants, a local network or enterprise, time stamps, department, and/or content of the media stream.

At act S107, the controller 303 encrypts the at least one stream key with the master key. The master key may be a symmetric encryption algorithm that uses the same key for both encryption and decryption. One example of a symmetric encryption algorithm is the advanced encryption standard (AES).

The controller 303 may access a compatibility matrix that associates types of stream keys with the appropriate type of master key for encrypting the stream key. In one example, the compatibility matrix specifies the length of the master key that is compatible with the stream key or vice versa. The master key length may be greater than or equal to the length of the at least one stream key. The lengths of the keys may be measured in octets.

The controller 303 may determine a security level for the media stream based on the participants or the local network and determine whether to encrypt and store the stream key based on the security level.

At act S109, the controller 303 causes the encrypted at least one stream key to be stored in association with the encrypted media stream. In one example, the encrypted stream key and encrypted media stream are stored together at a cloud based storage service.

The controller 303 may also generate metadata that describes the media stream. The metadata may be derived from the metadata described above. The controller 303 may encrypt the metadata using the master key. The metadata is combined with the encrypted media stream. The metadata may include data indicative of a time interval that the at least one stream key is valid, data indicative of an authorized user of the at least one stream key, and/or data indicative of participants in the media stream or subject matter of the media stream.

The stream key may include multiple components or distinct stream keys that are associated with different time intervals of the media stream. For example, the acts S105 and S107 may be repeated two or more times while the media stream is being recorded. The rekeying or selection of new keys may be controlled by a time period listed in the identifier or a predetermined time period. The rekeying or selection of new keys may be initiated manually by a user.

In another example, FIG. 4 illustrates an example receiving device. The receiving device requests to play the recorded media stream. The receiving device may be the local endpoint 101, the remote endpoint 115, or another device (e.g., any device authorized to fetch the content from the cloud storage service). The receiving device includes at least a memory 301, a controller 303, and a communication interface 305. Additional different or fewer components may be included.

Figure 6:
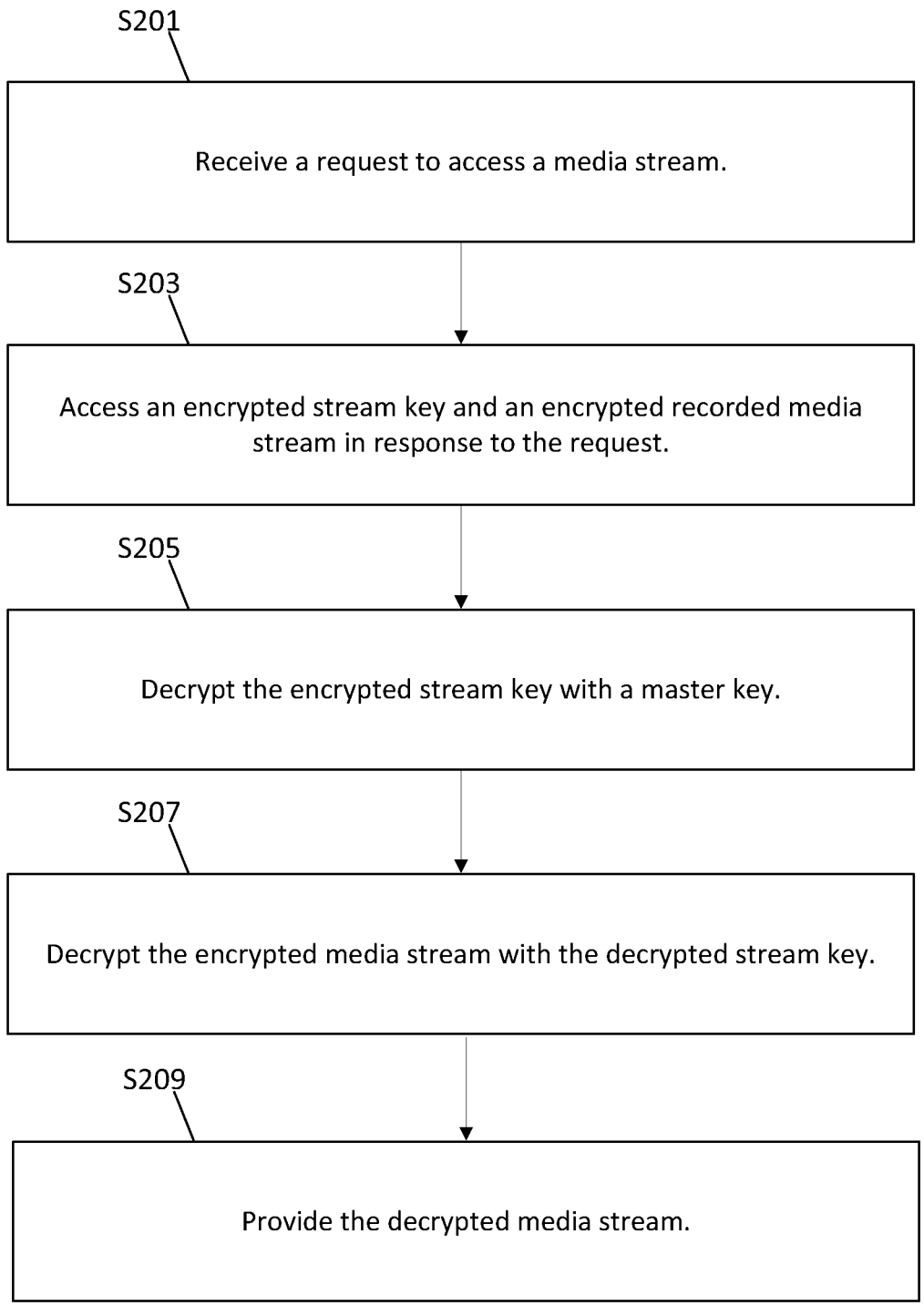
FIG. 6 illustrates an example flowchart for retrieving a cloud based recorded media session.

FIG. 6 illustrates an example flowchart for the receiving device. Additional, different, or fewer acts may be provided. The acts are performed in the order shown or other orders. The acts may also be repeated.

At act S201, the controller 303 or the communication interface 305 of FIG. 4 receives a request to access a media stream. The request may be a user input (e.g., selecting a recorded media stream from a list). For example, the list used to select a recorded media stream may include media streams stored at the cloud storage service. The list may be limited based on the authorization or security level of the receiving device or a user of the receiving device. In one example, users have access to all media recordings of which the user was a participant. In another example, a user may have access to media recordings that any of a particular set of users (e.g., company department) was a participant.

At act S203, the controller 303 accesses an encrypted stream key and an encrypted recorded media stream in response to the request. The encrypted stream key and the encrypted recorded media stream be associated based on an identifier stored in both the encrypted stream key and the encrypted recorded media stream. The encrypted stream key and the encrypted recorded media stream may be stored in a single file or at a single location at the cloud storage service.

At act S205, the controller 303 decrypts the encrypted stream key with a master key. The receiving device may be authorized to locally store the master key at memory 301. The receiving device may request the master key from an external device, such as the key management system 105. For example, the controller 303 may send a credential or username and password to the key management system 105. The key management system 105 authenticates the credential or username and password and returns the master key to the controller 303. The master key sent may be a temporary copy set to expire after a predetermined time or after a single usage.

At act S207, the controller 303 decrypts the encrypted media stream with the decrypted stream key. The controller 303 may determine whether the decrypted stream key corresponds to the encrypted media stream. For example, the controller 303 may verify that a message including the decrypted stream key is authenticated using an authentication key (a third key) as described in RFC 5764 and published on the IETF website in May 2010. The authentication key may be hash-based message authentication code that simultaneously verifies the integrity of the message and authenticates the origin of the message.

At act S209, the controller 303 provides providing the decrypted media stream to another device or to a user. The decrypted media stream may be played for the user (e.g., video stream, audio stream, or a combination). The decrypted media stream may be converted to a particular format that can be played by a media player. The decrypted media stream may be sent to an endpoint that requested access in S203.

The controller 303 may also receive encrypted media data for the media stream. The controller 303 may decrypt the metadata using the master key or the decrypted stream key. As discussed in the examples above, the metadata may include a time interval that the stream key is valid, an authorized user of the media session, participants in the media stream, or data indicative of subject matter of the media stream.

The controller 303 may include a general processor, digital signal processor, an application specific integrated circuit (ASIC), field programmable gate array (FPGA), analog circuit, digital circuit, combinations thereof, or other now known or later developed processor. The controller 303 may be a single device or combinations of devices, such as associated with a network, distributed processing, or cloud computing.

The memory 301 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the network device 103, such as a secure digital (SD) memory card.

In addition to ingress ports and egress ports, the communication interface 305 may include any operable connection. An operable connection may be one in which signals, physical communications, and/or logical communications may be sent and/or received. An operable connection may include a physical interface, an electrical interface, and/or a data interface.

The memory 301 is a non-transitory computer-readable medium, which may be a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   establishing a media call stream, wherein the media call stream is a voice over internet protocol call or video conference call and includes at least one parameter;
   receiving a request to record the media call stream;
   receiving, in response to receiving the request to record the media call stream, at least one stream key associated with the media call stream and the at least one parameter for the voice over internet protocol call or video conference call, wherein the media call stream is encrypted with the at least one stream key to produce an encrypted media call stream;
   accessing, in response to receiving the request to record the media call stream, a master key;
   encrypting, in response to receiving the request to record the media call stream, with a processor, the at least one stream key with the master key to produce an encrypted at least one stream key;
   generating metadata for the media call stream;
   encrypting, with the processor, the metadata with the master key; and
   storing, in response to receiving the request to record the media call stream, the encrypted at least one stream key in association with the encrypted media call stream.

2. The method of claim 1, further comprising:
   identifying a property of the media call stream; and
   accessing a rule in response to the media call stream, wherein the rule indicates the media call stream should be recorded based on the property.

3. The method of claim 2, wherein the property includes an endpoint of the media call stream, a content of the media call stream, or a user of the media call stream.

4. The method of claim 1, further comprising:
   changing the stream key when the stream key is used to encrypt a number of packets in the media call stream greater than a threshold number.

5. The method of claim 1, wherein the metadata includes data indicative of a time interval that the at least one stream key is valid.

6. The method of claim 1, wherein the metadata includes data indicative of an authorized user of the at least one stream key.

7. The method of claim 1, wherein the metadata includes data indicative of participants in the media call stream or subject matter of the media call stream.

8. The method of claim 1, wherein the at least one stream key includes multiple stream keys assigned to different time periods of the media call stream.

9. The method of claim 1 further comprising:
generating an identifier for the media call stream; and
storing the identifier at a cloud device in association with the encrypted media call stream.

10. The method of claim 1, further comprising:
receiving a request for the encrypted media call stream; and
providing the encrypted media call stream and the encrypted at least one stream key in response to the request for the encrypted media call stream.

11. An apparatus comprising:
a processor; and
a memory comprising one or more instructions executable by the processor to perform:
establishing a media call stream, wherein the media call stream includes at least one parameter;
receiving a request to record the media call stream;
receiving, in response to receiving the request to record the media call stream, at least one stream key associated with the media call stream and the at least one parameter, wherein the media call stream is encrypted with the at least one stream key to form an encrypted media call stream;
accessing, in response to receiving the request to record the media call stream, a master key;
encrypting, in response to receiving the request to record the media call stream, the at least one stream key with the master key to produce an encrypted at least one stream key;
generating metadata for the media call stream;
encrypting the metadata with the master key; and
storing, in response to receiving the request to record the media call stream, the encrypted at least one stream key in association with the encrypted media call stream at a cloud device.

12. The apparatus of claim 11, wherein the instructions are executable by the processor to perform:
identifying a property of the media call stream; and
accessing a rule in response to the media call stream, wherein the rule indicates the media call stream should be recorded based on the property.

13. The apparatus of claim 12, wherein the property includes an endpoint of the media call stream, a content of the media call stream, or a user of the media call stream.

14. The apparatus of claim 11,
wherein the metadata includes data indicative of a time interval that the at least one stream key is valid, data indicative of an authorized user of the at least one stream key, or data indicative of participants in the media call stream or subject matter of the media call stream.

15. A method comprising:
receiving a request to access a recorded media call stream, wherein the media call stream is a voice over internet protocol call or a video conference call and includes at least one parameter;
accessing, from a cloud device, an encrypted stream key, an encrypted recorded media call stream, and encrypted metadata for the media call stream in response to the request and the at least one parameter;
decrypting, with a processor, the encrypted stream key with a master key to obtain a decrypted stream key;
decrypting, with the processor, the encrypted metadata using the master key;
decrypting, with the processor, the encrypted recorded media call stream with the decrypted stream key to obtain a decrypted media call stream; and
providing the decrypted media call stream.

16. The method of claim 15, wherein a length of the master key is equal to or greater than a length of the stream key.

17. The method of claim 16, wherein the metadata includes data indicative of a time interval during which the stream key is valid.

18. The method of claim 16, wherein the metadata includes data indicative of an authorized user of the stream key, data indicative of participants in the media call stream, or data indicative of subject matter of the media call stream.

19. An apparatus comprising:
a processor; and
a memory comprising one or more instructions executable by the processor to perform:
receiving a request to access encrypted recorded media call stream, wherein the media call stream includes at least one parameter;
accessing an encrypted stream key associated with the media call stream and the at least one parameter;
decrypting, with a processor, the encrypted stream key with a master key;
decrypting, with the processor, encrypted metadata for the media call stream using the master key; and
decrypting, with the processor, an encrypted media call stream with the decrypted stream key.

20. The apparatus of claim 19, wherein the encrypted recorded media call stream is stored in association with the encrypted stream key.

* * * * *